United States Patent [19]

Fernandez et al.

[11] Patent Number: 5,639,504
[45] Date of Patent: Jun. 17, 1997

US005639504A

[54] PROCESS FOR PREPARING SAUSAGE PRODUCTS

[75] Inventors: Isabel Fernandez; Marcel Alexandre Juillerat, both of Lausanne; Rao Mandava, Vevey, all of Switzerland

[73] Assignee: Nestec S.A., Vevey, Switzerland

[21] Appl. No.: 358,347

[22] Filed: Dec. 19, 1994

[30] Foreign Application Priority Data

Feb. 17, 1994 [EP] European Pat. Off. ............. 94102349

[51] Int. Cl.$^6$ ..................................... A23L 1/317
[52] U.S. Cl. ............................. 426/646; 426/412
[58] Field of Search ...................... 426/105, 264, 426/646, 410, 413, 412; 452/30

[56] References Cited

U.S. PATENT DOCUMENTS

| | | |
|---|---|---|
| 2,847,312 | 8/1958 | Harper et al. |
| 3,011,895 | 12/1961 | Toepper et al. ................ 426/413 |
| 4,123,557 | 10/1978 | Epstein et al. ................ 426/105 |
| 4,504,500 | 3/1985 | Schneck et al. ............... 426/413 X |
| 4,752,492 | 6/1988 | Sato et al. ...................... 426/513 |

FOREIGN PATENT DOCUMENTS

| | | |
|---|---|---|
| 0279883A1 | 8/1988 | European Pat. Off. |
| 3-87165 | 4/1991 | Japan ............................. 426/410 |

OTHER PUBLICATIONS

Macfarlane, et al., "Binding of Comminuted Meat: Effect of High Pressure", Meat Science 10 (1984) pp. 307–320 (Macfarlane IV).

Macfarlane "Pressure–Induced Solubilization of Meat Proteins in Saline Solution", Journal of Food Science vol. 39 (1974), pp. 542–547 (Macfarlane I).

Macfarlane, et al., "Pressure–Induced Solubilization of Myofibrillar Proteins", Journal of Food Science, vol. 41(1976), pp. 1442–1446 (Macfarlane II).

Macfarlane, "High Pressure Technology and Meat Quality", *Developments in Meat Science*, R. Lawrie, Ed., Elsevier Applied Science Publications, Ltd., London, UK, Chapter 6, pp. 155–184 (1985) (Macfarlane III), and Shigehisa, et al., "Effects of High Hyorostatic Pressure and Inactivation of Microorganisms Associated with Meat and Meat Products", International Journal of Food Microbiology, vol. 12 (1991), pp. 207–216.

Giese, "Developing Low–Fat Meat Products", Food Technology 46, No. 4, Apr., 1992, pp. 100–109.

*Primary Examiner*—Arthur L. Corbin
*Attorney, Agent, or Firm*—Vogt & O'Donnell, LLP

[57] ABSTRACT

A low-fat and/or low-salt and/or low-phosphate sausage is prepared by subjecting an encased meat batter, which has been prepared from meat, added fat, ice and nitrite curing salt and then stuffed into a casing, to a hydrostatic pressure of from 500 bar to 4,000 bars and then cooking the pressure-treated sausage.

13 Claims, No Drawings

PROCESS FOR PREPARING SAUSAGE PRODUCTS

BACKGROUND OF THE INVENTION

The present invention concerns the manufacture of sausages, particularly sausages having low salt and/or low phosphate and/or low fat and/or high water content(s) and relates to treatment of a food with pressure, particularly hydrostatic pressure.

U.S. Pat. No. 4,752,492 discloses a process for effecting gelation of ground fish meat by applying a pressure of from 10 to 200 bar thereto without adding any salts such as common salt. This process is actually specifically intended for preparing a fish meat gel product resembling a kamaboko product which may be finely ground and mixed with minced meat in preparing hamburger, for example.

SUMMARY OF THE INVENTION

The object of the present invention is to provide a process for manufacturing low salt and/or low phosphate and/or low fat and/or high water sausages which could not be manufactured with a traditional process comprising preparing a meat batter comprising or consisting essentially of or consisting of meat, ice and nitrite curing salt and optionally added fat, stuffing and cooking.

To this end, the process according to the present invention comprises a step of treating the stuffed meat batter with a hydrostatic pressure of from 500 to 4000 bar before cooking.

As a matter of fact, the present process surprisingly permits manufacture of low salt and/or low phosphate and/or low fat and/or high water sausages which could hardly be manufactured with a traditional process comprising preparing a meat batter consisting of meat, added fat, ice and nitrite curing salt, stuffing and cooking, because their texture would not be firm enough and/or because the cooking yield would be too low.

DETAILED DESCRIPTION OF THE INVENTION AND DESCRIPTION OF THE PREFERRED EMBODIMENTS

Throughout the present specification, the expression "low salt sausages" means sausages having a salt content which may be considered to be relatively low in view of the fact that the phosphate content and/or the fat content is low and/or the water content is high. Thus, the present meat batter may comprise from 1.2 to 2.4%, preferably from 1.4 to 1.8% nitrite curing salt added during chopping.

A nitrite curing salt may consist of a mixture of sodium chloride with sodium nitrite, the amount of the latter representing from 0.3 to 1.0%, preferably from 0.4 to 0.6% of the salt, for example.

Similarly, the expression "low phosphate sausages" means sausages having a phosphate content which is very low and possibly nearly zero. Thus, the present meat batter may comprise up to 0.3%, preferably up to 0.1% phosphate, especially sodium diphosphate, added during chopping.

The expression "low fat sausages" means sausages having a fat content which may be lower than the fat content of traditional finely comminuted cooked meat sausages, which may typically comprise from 40 to 50% lean meat, from 25 to 35% added fat and from 20 to 30% water. Thus, the present meat batter may comprise fat added during chopping in such proportions that it has a fat content of from 1 to 30%, preferably from 1 to 10%.

The expression "high water sausages" means sausages having a water content which may be higher than the water content of said traditional finely comminuted meat sausages. Thus, the present meat batter may comprise from 20 to 50%, preferably from 25 to 45% water added during chopping in the form of ice.

Preferably, the present process comprises the steps of:
grinding comminuted meat,
chopping the ground meat, while adding the ice, the nitrite curing salt, optionally phosphate, and optionally fat,
stuffing the batter thus obtained into casings,
vacuum-packing the raw sausages thus obtained,
treating the vacuum-packed sausages with a hydrostatic pressure of from 500 to 4000 bars,
unpacking the pressure-treated sausages,
optionally reddening, and then
cooking and/or smoking and cooling them.

For carrying out the process of the present invention, one can use lean meat, namely a meat having a fat content of from 1 to 20%, of pork, beef, mutton or chicken, for example. The present meat batter may comprise from 40 to 70%, preferably from 50 to 60% ground meat.

The added fat is preferably an animal fat, such as backfat which has a fat content of about 90%, for example. This added fat may be ground before being added to the batter. However, good results may also be obtained with a vegetable oil such as soya oil, sunflower oil or corn oil, for example.

Optionally, 2 to 8 g mixed spices, up to 1 g sodium ascorbate, up to 3% starch and up 2 g dextrose may be added per kg of meat batter, preferably at the time the fat is added.

Preferably the pH of the batter should be in the range of from 5.8 to 6.5. If the pH of the batter is below this range, there is a risk of important deterioration of the water binding in the sausage product. The myofibrillar proteins, namely, may begin to increasingly repell water as the pH further drops. Possible pH adjustments may be made by adding sodium carbonate or sodium bicarbonate, for example.

Grinding the meat and/or the added fat may be carried out in a traditional meat grinder, for example.

Chopping the ground meat and other components for obtaining the batter may be carried out in a bowl chopper, of which the cutters may rotate at a speed of from 1000 to 6000 rpm while the bowl may rotate at a speed of from 10 to 30 rpm, for example.

This chopping may advantageously be carried out by firstly chopping the ground meat, while adding the ice, the nitrite curing salt and optionally phosphate, at a temperature of from 1° to 10° C. in one or more runs for a total time of from 30 s to 3 min, the batter being cooled between two successive runs, and then chopping to a temperature of from above 10° to 15° C., while optionally adding fat.

An additional step of vacuum chopping for 30 s to 3 min may be advantageously provided before the stuffing step.

Stuffing the meat batter may be carried out by stuffing the batter into natural or synthetic casings, especially into cellular peel-off or moisture-proof fibrous casings, for example.

For treating the stuffed meat batter, namely the raw sausages, with a hydrostatic pressure of from 500 to 4000 bars, it is preferred to isolate the outer surface of the casings from a liquid used for transmitting such a high pressure, a water or an oil for example, by means of vacuum packing the sausages into synthetic pouches, for example. These pouches may themselves be placed within a chamber of a high pressure equipment where the high hydrostatic pressure treatment may be carried out for a time and at a temperature adequate for obtaining an actual effect on the texture and on the cooking yield of the sausages. The treatment time may be up to 60 min, preferably up to 10 min, for example. This treatment time is reckoned from the moment when the hydrostatic pressure reaches the desired value, the time necessary for raising the pressure to this value being about one minute, for example. The treatment temperature may be from −15° C. to 100° C., preferably from 5° to 60° C., for example.

The pressure-treated sausages may then be unpacked.

The unpacked sausages may be reddened by holding them for up to 45 min at room temperature, for example.

The sausages may then be steam cooked within a cooking or a smoking-cooking chamber of adequate equipment either in one step, for about 45 to 75 min at about 70° to 98° C., or according to a cooking or smoking-cooking program usual in the art, for example. Such programs may comprise successive steps of warming, drying, steam smoking and/or steam cooking for about 5 to 30 min a step at temperatures of from 35° to 80° C. and at a possibly controlled humidity of from 30 to 70%.

The sausages may then be cooled under cold water and kept in a refrigerated chamber at about 4° to 5° C., for example.

The present process can be carried out for manufacturing low salt and/or low phosphate and/or low fat and/or high water sausages of the type of finely comminuted cooked meat sausage products such as Lyoner, Frankfurter, Wiener, Bologna and Meat loaf, for example.

EXAMPLES

The examples hereafter illustrate different embodiments of the process and of the product according to the present invention. The percentages are by weight unless otherwise stated.

In these examples, the texture of the sausages was evaluated by testing their firmness with an Instron Universal Testing Machine (type 1140). For sausages of the Frankfurter type (Frankfurters), pieces 18 mm in diameter and 25 mm in length were sheared with a Warner-Bratzler (W-B) shear press cell (shear force expressed in N). For sausages of the Lyoner type (Lyoners), slices 50 mm in diameter and 10 mm in thickness were sheared with a Kramer multiblade shear press cell (shear force expressed in N).

The cooking yield was calculated from the weight of the sausages taken before and after cooking and expressed in percents without dimension.

In all the indicated recipes, the sum of the percentages of meat, added fat and ice was 100%. The respective amounts of the other ingredients, namely nitrite curing salt, phosphate and other additives am also indicated in % which are to be understood as by weight of the whole recipe, namely by total weight of the batter.

EXAMPLE 1

Pork shoulder lean meat having a fat content of about 5% was used two days after slaughtering. It was cut into pieces of fist size and ground in a meat grinder having a grid with 3 mm openings. The ground meat was stored in a refrigerator at 2° C.

20 kg of low fat-high water sausages were manufactured according to the following recipe:

Lean meat: 60%
Ice: 40%
Nitrite curing salt: 17.5 g/kg meat batter
Sodium diphosphate: 3 g/kg meat batter
Mixed spices: 4.0 g/kg meat batter Sodium ascorbate: 0.5 g/kg meat batter
Dextrose: 1 g/kg meat batter The process for manufacturing low fat-high water sausages was carried out by:

chopping (Seydelmann Bowl Chopper, Type K-20 RAS) the ground meat, while adding the ice, nitrite curing salt and sodium diphosphate, at low speed (speed 1, cutters rotate at 1500 rpm, bowl rotates at 15 rpm) for 1 min, starting at a temperature of 2° C. and ending at temperature just below 10° C., cooling back to 4° C. and further chopping at high speed (speed 2, cutters rotate at 3000 rpm, bowl rotates at 25 rpm) for 5 to 10 s to a temperature just below 10° C., chopping at high speed, while adding the mixed spices, sodium ascorbate and dextrose, vacuum chopping (Stephan Vacuum Cutter, Type VM 60) at low speed for 2 min, stuffing (Mado Filler, Type MWF 591 D) the batter thus obtained into moisture-proof fibrous casings 50 mm in diameter, vacuum packing the raw Lyoners thus obtained, treating (National Forge, high pressure chamber of 8.5 l) the vacuum packed Lyoners at a hydrostatic pressure of 1000 bar for 5 min at about 10° C., unpacking the pressure treated Lyoners, holding them for 30 min at ambient temperature for reddening, steam cooking a part of them at 75° C. and another part at 95° C. for 1 h, and cooling them to ambient temperature.

The cooking yield and the firmness of the Lyoners manufactured in this way are shown in Table I hereunder together with the values obtained for comparison with control Lyoners which were not high pressure treated.

TABLE I

| Pressure | Cooking yield (%) | | Shear force (N) (Kramer cell) | |
|---|---|---|---|---|
| (bar) | 75° C. | 95° C. | 75° C. | 95° C. |
| 0 | 96.13 | 94.94 | 207.11 | 163.11 |
| 1000 | 97.23 | 94.99 | 243.27 | 201.00 |

It may be seen in Table I that the low fat-high water Lyoners manufactured by the present process had a slightly higher cooking yield and a much firmer texture than the control Lyoners which were not high pressure treated.

EXAMPLE 2

Low phosphate-low fat-high water Lyoners were manufactured in the way shown in Example 1, except the fact that the recipe comprised 55% lean meat and 45% ice, 15 g nitrite curing salt per kg of meat batter, no phosphate, no spices, no dextrose, no ascorbate and that cooking was carried out at 75° C. only.

The cooking yield and the firmness of the Lyoners manufactured in this way are shown in Table II hereunder together with the values obtained for comparison with control Lyoners which were not high pressure treated.

TABLE II

| Pressure (bar) | Cooking yield (%) | Shear force (N) (Kramer cell) |
|---|---|---|
| 0 | 72.81 | 106.11 |
| 1000 | 83.67 | 153.78 |

It may be seen in Table II that both the cooking yield and the firmness of the low phosphate-low fat-high water Lyoners manufactured by the present process increased as compared with those of the control Lyoners which were not high-pressure treated.

EXAMPLE 3

Pork shoulder lean meat and pork backfat were used two days after slaughtering. The lean meat which had a fat content of about 5% was cut into pieces of fist size and the backfat which had a fat content of about 90% was cut into pieces of about 5×10 cm. Both the lean meat pieces and the backfat pieces were separately ground in a meat grinder having a grid with 3mm openings. The ground meat and fat were stored in a refrigerator at 2° C.

60 kg of low phosphate sausages were manufactured according to the following recipe:

Lean meat: 50%

Backfat: 25%

Ice: 25%

Nitrite curing salt: 15 g/kg meat batter

Sodium diphosphate: 0.5 g/kg meat batter

The process for manufacturing the low phosphate sausages was carried out by:

chopping (Seydelmann Bowl Chopper, Type K-20 RAS) the ground meat, while, adding the ice, nitrite curing salt and sodium diphosphate, at low speed (speed 1, cutters rotate at 1500 rpm, bowl rotates at 15 rpm) for 1 min, starting at a temperature of 2° C. and ending at a temperature just below 10° C., cooling back to 4° C. and further chopping at high speed (speed 2, cutters rotate at 3000 rpm, bowl rotates at 25 rpm) for 5 to 10 s to a temperature just below 10° C., chopping at high speed, vacuum chopping (Stephan Vacuum Cutter, Type VM 60) at low speed for 2 min, stuffing (Mado Filler, Type MWF 591 D) the batter thus obtained into cellular peel-off casings 18 mm in diameter, vacuum packing the raw Frankfurter thus obtained, treating (National Forge, high pressure chamber of 8.5 l) different samples of the vacuum packed Frankfurter at different hydrostatic pressures of 500, 750, 1000, 2000, 3000 and 3800 bar for 5 min at about 10° C., unpacking the pressure treated Frankfurter, steam cooking them within a steam cooking chamber with humidity control (Rational, Type 111) according to a cooking program A comprising three heating steps, the first at 55° C. and at a controlled humidity of 60% for 20 min, the second at 65° C. and at a controlled humidity of 60% for 30 min, and the third at 75° C. without humidity control for 25 min, and cooling them to ambient temperature.

The cooking yield and the hardness of the Frankfurters manufactured in this way are shown in Table III hereunder together with the values obtained for comparison with control Frankfurters which were not high-pressure treated.

TABLE III

| Pressure (bar) | Cooking yield (%) | Shear force (N) (W-B cell) |
|---|---|---|
| 0 | 82.27 | 10.58 |
| 500 | 82.28 | 12.95 |
| 750 | 82.78 | 13.78 |
| 1000 | 83.46 | 15.44 |
| 2000 | 84.31 | 17.80 |
| 3000 | 83.54 | 16.50 |
| 3800 | 83.32 | 15.23 |

It may be seen in Table III that the low phosphate Frankfurters manufactured by the present process had a slightly higher cooking yield and a much firmer texture (with the highest increase being at 2000 bar) than the control Frankfurters which were not high-pressure treated.

EXAMPLE 4

Two different sets of low fat-low phosphate Frankfurters numbered as 4.1 and 4.2 were manufactured in the way shown in Example 3 but according to the following two different recipes:

Lean meat: 60%

Backfat: 5%

Ice: 35%

| Set No. | 4.1 | 4.2 |
|---|---|---|
| Nitrite curing salt (g/kg meat batter) | 15 | 15 |
| Sodium diphosphate (g/kg meat batter) | 0.0 | 0.5 |

Mixed spices: 4.0 g/kg meat batter

Sodium ascorbate: 0.5 g/kg meat batter

Dextrose: 1 g/kg meat batter

The cooking yield and the hardness of the Frankfurters manufactured in this way are shown in Table IV hereunder together with the values obtained for comparison with control Frankfurters which were not high-pressure treated.

TABLE IV

| Pressure (bar) | Cooking yield (%) | | Shear force (N) (W-B cell) | |
|---|---|---|---|---|
| | 4.1 | 4.2 | 4.1 | 4.2 |
| 0 | 75.11 | 73.49 | 9.60 | 8.91 |
| 500 | 76.00 | 74.25 | 10.50 | 10.30 |
| 750 | 78.39 | 78.57 | 10.88 | 10.90 |
| 1000 | 79.24 | 79.09 | 13.40 | 12.85 |
| 2000 | 82.98 | 83.92 | 16.70 | 16.30 |
| 3000 | 81.30 | 80.85 | 14.30 | 14.30 |
| 3800 | 80.80 | 80.91 | 14.26 | 14.26 |

It may be seen in Table IV that the low fat-low phosphate Frankfurters manufactured by the present process had a higher cooking yield and a firmer texture (with the highest increase being at 2000 bar) than the control Frankfurters which were not high pressure treated.

EXAMPLE 5

One set of low phosphate-low fat Frankfurters numbered as 5.1 and one set of low phosphate Frankfurters numbered as 5.2 were manufactured in the way shown in Example 3 for two different hydrostatic pressures of 1000 and 2000 bar and according to the following two different recipes:

| Set No. | 5.1 | 5.2 |
|---|---|---|
| Lean meat (%) | 60 | 50 |
| Backfat (%) | 5 | 25 |
| Ice (%) | 35 | 25 |
| Nitrite curing salt (g/kg meat batter) | 15 | 15 |
| Sodium diphosphate (g/kg meat batter) | 0.5 | 0.5 |
| Mixed spices (g/kg meat batter) | 4.0 | 4.0 |
| Sodium ascorbate (g/kg meat batter) | 0.5 | 0.5 |
| Dextrose (g/kg meat batter) | 1.0 | 1.0 |

Instead of being steam cooked as disclosed in Example 3, these sausages were steam smoked-cooked within a steam smoking-cooking chamber (Autotherm, Type 6349) according to a program B comprising warming at 50° C. and at 60% humidity for 17 min, drying at 55° C. and at 37% humidity for 7 min, steam smoking at 68° C. for 10 min and steam cooking at 72° C. for 12 min.

The cooking yield and the hardness of the Frankfurters manufactured in this way are shown in Table V hereunder together with the values obtained for comparison with control Frankfurters samples which were not high-pressure treated.

TABLE V

| Pressure | Cooking yield (%) | | Shear force (N) (W-B cell) | |
|---|---|---|---|---|
| (bar) | 5.1 | 5.2 | 5.1 | 5.2 |
| 0 | 83.39 | 90.60 | 10.27 | 13.35 |
| 1000 | 87.63 | 91.52 | 18.85 | 14.96 |
| 2000 | 88.71 | 91.86 | 19.60 | 15.20 |

It may be seen in Table V that the low phosphate-low fat Frankfurters and the low-phosphate Frankfurters manufactured by the present process had a higher cooking yield and a firmer texture than the control Frankfurters which were not high-pressure treated.

EXAMPLE 6

Two batches of low phosphate-low fat-high water Frankfurters numbered as 6.1 and 6.2 were manufactured in the way shown in Example 3 for a hydrostatic pressure of 1000 bar and according to the following two different recipes the second of which comprises 2% of a modified potato starch (Lerf AC):

| Batch No. | 6.1 | 6.2 |
|---|---|---|
| Lean meat (%) | 60 | 60 |
| Backfat (%) | 5 | 5 |
| Ice (%) | 35 | 35 |
| Nitrite curing salt (%) | 1,5 | 1,5 |
| Starch (%) | — | 2.0 |

The cooking yield and the hardness of the Frankfurters manufactured in this way are shown in Table VI hereunder together with the values obtained for comparison with control samples which were not high-pressure treated.

TABLE VI

| Pressure | Cooking yield (%) | | Shear force (N) (W-B cell) | |
|---|---|---|---|---|
| (bar) | 6.1 | 6.2 | 6.1 | 6.2 |
| 0 | 76.29 | 79.16 | 16.75 | 17.66 |
| 1000 | 81.83 | 85.02 | 24.49 | 24.73 |

It may be seen in Table VI that the low phosphate-low fat-high water Frankfurters manufactured by the present process with or without starch had a higher cooking yield and a firmer texture than the control Frankfurters which were not high pressure treated.

EXAMPLE 7

Three batches of low phosphate-low fat-high water Frankfurters were manufactured in the way shown in Example 3 for a hydrostatic pressure of 1000 bar and according to the following recipe:

| Lean meat (%) | 60 |
|---|---|
| Backfat (%) | 5 |
| Ice (%) | 35 |
| Nitrite curing salt (%) | 1.5 |

The three batches of sausages were high pressure treated at different temperatures for 5 min continuously or intermittently, namely one batch at 10° C. for 5 min, another batch at 50° C. for 5 min and the last batch at 10° C. for 5 cycles of 1 min each, the pressure being released between the cycles.

The cooking yield and the hardness of the Frankfurters manufactured in this way are shown in Table VII hereunder together with the values obtained for comparison with control Frankfurters which were not high pressure treated.

TABLE VII

| Pressure (bar) | Temperature (°C.) | Time (min) | Cooking yield (%) | Shear force (N) (W-B cell) |
|---|---|---|---|---|
| 0 | — | — | 72.99 | 8.89 |
| 1000 | 10 | 5 | 81.10 | 15.14 |
| 1000 | 50 | 5 | 81.40 | 17.15 |
| 1000 | 10 | 5 × 1 | 78.94 | 17.92 |

It may be seen in Table VII that the low phosphate-low fat-high water Frankfurters manufactured by the present process under the above different conditions had a higher cooking yield and a firmer texture than the control Frankfurters which were not high-pressure treated.

We claim:

1. In a process for preparing a sausage product wherein a batter comprising chopped meat, added water, added fat and nitrite curing salt components is prepared, then stuffed into a casing and then the encased product is cooked, the improvements comprising:

preparing the batter so that the batter consists essentially of, by weight, meat in an amount of from 40% to 70%, added water in an amount of from 20% to 50%, nitrite curing salt components in an amount up to 1.8% and a fat content of less than 25% by weight, and prior to cooking the encased product, vacuum packing the encased product in a package to obtain a vacuum-packed encased product, subjecting the vacuum-packed, encased product to hydrostatic pressure of from 500 bars to 2000 bars to obtain a pressure-treated encased product contained in the package and then unpacking the pressure-treated encased product from the package prior to cooking the encased product.

2. A process according to claim 1 wherein the vacuum-packed, encased product is subjected to the hydrostatic pressure for up to 60 minutes.

3. A process according to claim 2 wherein the vacuum-packed, encased product is subjected to the hydrostatic pressure at a temperature of from −15° C. to 100° C.

4. A process according to claim 1 wherein the vacuum-packed, encased product is subjected to the hydrostatic pressure for up to 10 min at a temperature of from 5° C. to 60° C.

5. A process according to claim 1 wherein the batter contains from 50% to 60% chopped meat by weight.

6. A process according to claim 1 wherein the batter contains from 25% to 45% added water by weight.

7. A process according to claim 1 or 5 wherein the batter has a fat content of up to 10%.

8. A process according to claim 7 wherein the chopped meat is a chopped lean meat.

9. A process according to claim 1 wherein the batter has a fat content of up to 20%.

10. A process according to claim 1 wherein the batter is a low-phosphate sausage batter.

11. A process according to claim 1 wherein the batter contains from 1.4% to 1.8% nitrite curing salt components.

12. A process according to claim 1 wherein the batter contains 1.2 to 1.8% nitrite curing salt components.

13. A process according to claim 1 wherein the vacuum-packed, encased product is subjected to the hydrostatic pressure and then the pressure is released and then, at least once more, the vacuum-packed, encased product is subjected to the hydrostatic pressure and the pressure is then released.

* * * * *

UNITED STATES PATENT AND TRADEMARK OFFICE
CERTIFICATE OF CORRECTION

PATENT NO. : 5,639,504
DATED      : June 17, 1997
INVENTOR(S): Isabel FERNANDEZ, et al.

It is certified that error appears in the above-indentified patent and that said Letters Patent is hereby corrected as shown below:

On the title page, Item "[56] References Cited", in the title of the Shigehisa article "...Hyorostatic..." should be -- ...Hydrostatic... --.

Column 9, line 18, (line 1 of claim 6), after "1", insert --or 5--.

Column 10, line 15, (line 3 of claim 13), after "is", insert --then--.

Signed and Sealed this

Sixteenth Day of September, 1997

Attest:

BRUCE LEHMAN

Attesting Officer    Commissioner of Patents and Trademarks